US012482480B2

(12) United States Patent
Liu et al.

(10) Patent No.: US 12,482,480 B2
(45) Date of Patent: Nov. 25, 2025

(54) SPEECH ENHANCEMENT METHODS AND PROCESSING CIRCUITS PERFORMING SPEECH ENHANCEMENT METHODS

(71) Applicant: SigmaStar Technology Ltd., Xiamen (CN)

(72) Inventors: Jie Liu, Xiamen (CN); Fei-Yang Tong, Xiamen (CN); Cheng-Wei Zheng, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 29 days.

(21) Appl. No.: 18/369,401

(22) Filed: Sep. 18, 2023

(65) Prior Publication Data

US 2024/0242729 A1 Jul. 18, 2024

(30) Foreign Application Priority Data

Jan. 16, 2023 (CN) ........................ 202310067077.X

(51) Int. Cl.
*G10L 21/00* (2013.01)
*G10L 21/0232* (2013.01)

(52) U.S. Cl.
CPC ................................ *G10L 21/0232* (2013.01)

(58) Field of Classification Search
CPC . G10L 21/0232; G10L 21/02; G10L 21/0216; G10L 25/30; G10L 21/0208; G10L 2021/02082; G10L 2021/02085; G10L 2021/02087; G10L 2021/02161; G10L 2021/02163; G10L 2021/02165; G10L 2021/02166; G10L 2021/02168;
(Continued)

(56) References Cited

U.S. PATENT DOCUMENTS

2022/0319529 A1* 10/2022 Matsuo ................... G10L 25/84

FOREIGN PATENT DOCUMENTS

WO WO-2019227590 A1 * 12/2019 ......... G10L 21/0232

OTHER PUBLICATIONS

R. Biradar A. S. M, and P. V. Joshi, "Implementation of an Active Noise Cancellation Technique using Deep Learning," 2022 International Conference on Inventive Computation Technologies (ICICT), Nepal, published Jul. 22, 2022, pp. 249-253. (Year: 2022).*

(Continued)

*Primary Examiner* — Edgar X Guerra-Erazo
(74) *Attorney, Agent, or Firm* — WPAT, PC

(57) ABSTRACT

A processing circuit performing a speech enhancement method processes a to-be-processed signal to generate a target signal and executes a plurality of program codes or program instructions to perform the following steps: performing Fourier transform on the to-be-processed signal to generate a spectral signal of the to-be-processed signal; performing a first noise reduction processing on the spectral signal to obtain a first intermediate signal; performing a noise analysis on the first intermediate signal to obtain a noise feature; performing a second noise reduction processing on the first intermediate signal to generate a second intermediate signal when the noise feature does not satisfy a target condition; and performing inverse Fourier transform on the second intermediate signal to generate the target signal. The first noise reduction processing is different from the second noise reduction processing.

13 Claims, 9 Drawing Sheets

(58) Field of Classification Search
CPC ............. G10L 21/0224; G10L 21/0272; G10L 21/028; G10L 21/0364; G10L 21/0316; G10L 21/0332; G10L 21/038; G10L 21/057; G10L 25/27; G10L 2025/786; G10L 2025/783; G10L 25/78; G10L 25/81; G10L 25/84; G10L 2025/937; Y02T 90/00; H04R 2225/41; H04R 2225/43; H04R 25/43; H04R 25/507
See application file for complete search history.

(56) References Cited

OTHER PUBLICATIONS

A. Asad, R. Kaur and F. Mohammadi, "Noise Suppression Using Gated Recurrent Units and Nearest Neighbor Filtering, " 2022 International Conference on Computational Science and Computational Intelligence (CSCI), Las Vegas, NV, USA, published Dec. 16, 2022, pp. 368-372. (Year: 2022).*

Ke, Y., Li, A., Zheng, C., Peng, R., & Li, X. (2021). Low-complexity artificial noise suppression methods for deep learning-based speech enhancement algorithms. EURASIP Journal on Audio, Speech, and Music Processing, 2021, 1-15. (Year: 2021).*

* cited by examiner

SPEECH ENHANCEMENT METHODS AND PROCESSING CIRCUITS PERFORMING SPEECH ENHANCEMENT METHODS

This application claims the benefit of China application Serial No. 202310067077.X, filed on Jan. 16, 2023, the subject matter of which is incorporated herein by reference.

BACKGROUND OF THE INVENTION

1. Field of the Invention

The present invention generally relates to signal processing, and, more particularly, to a speech enhancement method and a processing circuit for performing the speech enhancement method.

2. Description of Related Art

Speech enhancement (SE), an important technology in voice calls, uses algorithms to suppress noise (including steady noise and non-steady noise) to improve voice quality. The effect of noise suppression directly determines the effect of speech enhancement. Therefore, the present invention provides a device and method to improve the effect of noise suppression (i.e., improve the effect of speech enhancement).

SUMMARY OF THE INVENTION

In view of the issues of the prior art, an object of the present invention is to provide a speech enhancement method and a processing circuit for performing the speech enhancement method, so as to improve the effect of noise suppression.

According to one aspect of the present invention, a processing circuit is provided. The processing circuit processes a to-be-processed signal to generate a target signal. The processing circuit executes a plurality of program codes or program instructions to perform the following steps: performing Fourier transform on the to-be-processed signal to generate a spectral signal of the to-be-processed signal; performing a first noise reduction processing on the spectral signal to obtain a first intermediate signal; performing a noise analysis on the first intermediate signal to obtain a noise feature; performing a second noise reduction processing on the first intermediate signal to generate a second intermediate signal when the noise feature does not satisfy a target condition; and performing inverse Fourier transform on the second intermediate signal to generate the target signal. The first noise reduction processing is different from the second noise reduction processing.

According to another aspect of the present invention, a speech enhancement method is provided. The speech enhancement method processes a to-be-processed signal to generate a target signal and includes the following steps: performing Fourier transform on the to-be-processed signal to generate a spectral signal of the to-be-processed signal; performing a first noise reduction processing on the spectral signal to obtain a first intermediate signal; performing a noise analysis on the first intermediate signal to obtain a noise feature; performing a second noise reduction processing on the first intermediate signal to generate a second intermediate signal when the noise feature does not satisfy a target condition; and performing inverse Fourier transform on the second intermediate signal to generate the target signal. The first noise reduction processing is different from the second noise reduction processing.

According to still another aspect of the present invention, a speech enhancement method is provided. The speech enhancement method processes a to-be-processed signal to generate a target signal and includes the following steps: performing Fourier transform on the to-be-processed signal to generate a spectral signal of the to-be-processed signal; performing a first noise reduction processing on the spectral signal to obtain a first intermediate signal; performing a second noise reduction processing on the first intermediate signal to generate a second intermediate signal; and performing inverse Fourier transform on the second intermediate signal to generate the target signal; wherein the first noise reduction processing is different from the second noise reduction processing.

The technical means embodied in the embodiments of the present invention can solve at least one of the problems of the prior art. Therefore, compared to the prior art, the present invention can improve the effect of noise suppression.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a speech enhancement method and a processing circuit for performing the speech enhancement method. On account of that some or all elements of the processing circuit for performing the speech enhancement method could be known, the detail of such elements is omitted provided that such detail has little to do with the features of this disclosure, and that this omission nowhere dissatisfies the specification and enablement requirements. Some or all of the processes of the speech enhancement method may be implemented by software and/or firmware and can be performed by the processing circuit for performing the speech enhancement method. A person having ordinary skill in the art can choose components or steps equivalent to those described in this specification to carry out the present invention, which means that the scope of this invention is not limited to the embodiments in the specification.

Figure 1:
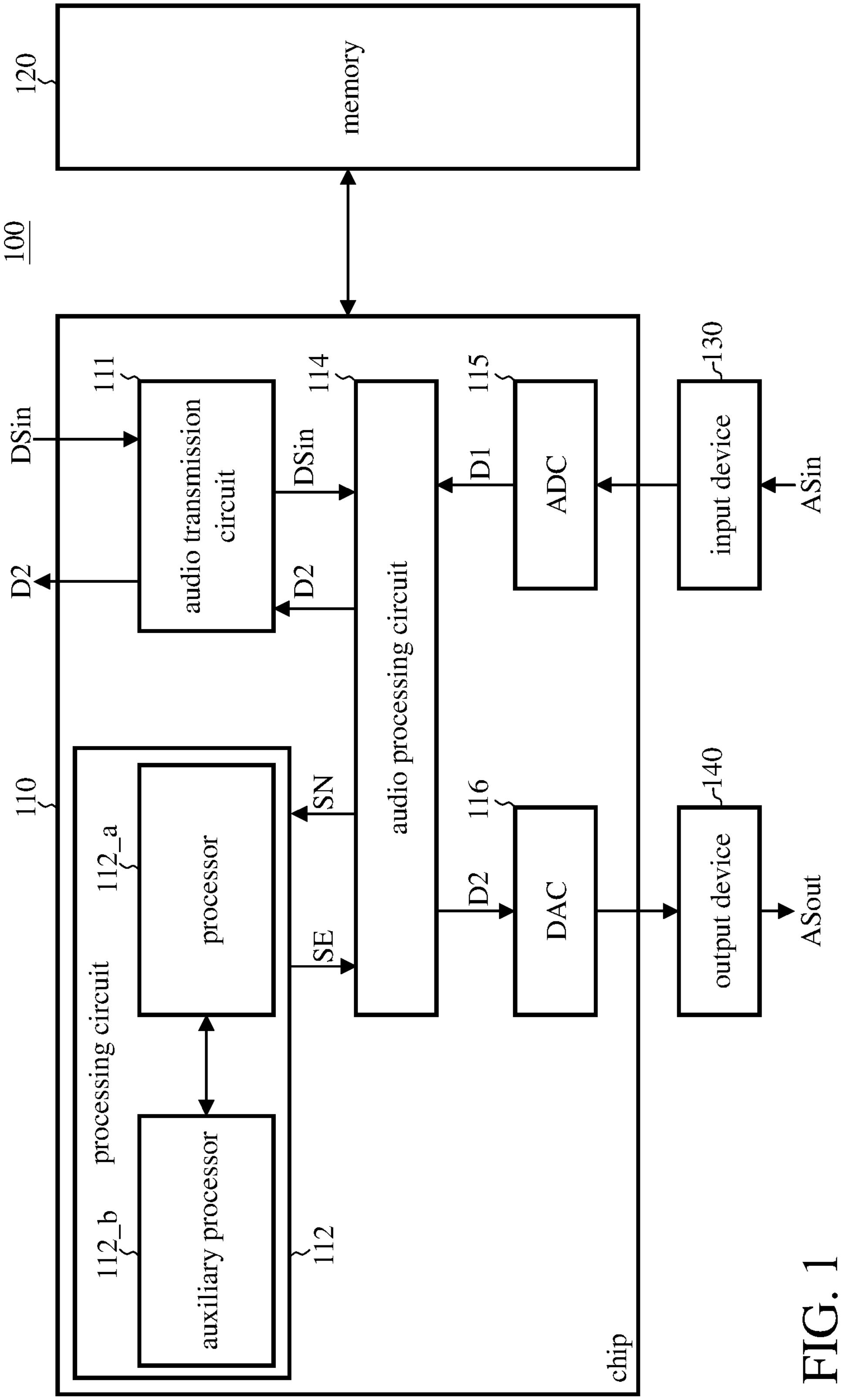
FIG. 1 is a functional block diagram of an electronic device according to an embodiment of the present invention.

FIG. 1 is a functional block diagram of an electronic device according to an embodiment of the present invention. The electronic device 100 includes a chip 110, a memory 120, an input device 130, and an output device 140. The chip 110 includes an audio transmission circuit 111, a processing circuit 112, an audio processing circuit 114, an analog-to-digital converter (ADC) 115, and a digital-to-analog converter (DAC) 116. The processing circuit 112 includes a processor 112_*a* and an auxiliary processor 112_*b*. The chip 110 is coupled to the memory 120. The memory 120 is used to store a plurality of program instructions and/or codes, and other data.

The input device 130 is used to input an analog input signal ASin (e.g., a speech signal) to the chip 110. The input device 130 may be a microphone.

The ADC 115 is used to convert the analog input signal ASin into a digital signal D1.

The audio transmission circuit 111 is used to receive a digital input signal DSin through a digital signal transceiver circuit (including but not limited to a wired network module, a wireless network module, a Bluetooth module, etc.).

The audio processing circuit 114 is used to perform audio processing on the digital input signal DSin or the digital signal D1 to generate the to-be-processed signal SN. In some embodiments, the audio processing circuit 114 may include a pulse density modulation (PDM) to pulse-code modulation (PCM) circuit, a resampling circuit, a filter circuit, and a digital programmable gain amplifier (DPGA). The PDM to PCM circuit is used to convert a PDM signal into a PCM signal. The resampling circuit is used to convert the high-sampling-rate PCM signal into a low-sampling-rate PCM signal. The filter circuit is used to filter out high frequency components and DC components. The DPGA is used to adjust the gain of the filtered signal.

In some embodiments, the chip 110 further includes a direct memory access (DMA) circuit. The DMA circuit stores the to-be-processed signal SN generated by the audio processing circuit 114 in the memory 120, and reads the to-be-processed signal SN from the memory 120 and then provides it to the processing circuit 112.

The processing circuit 112 is used to perform speech enhancement processing on the to-be-processed signal SN to generate a target signal SE (i.e., a noise-suppressed (speech-enhanced) signal). The processing circuit 112 can perform speech enhancement processing by executing program instructions and/or codes stored in the memory 120.

The processor 112_*a* may be a general-purpose processor capable of executing programs, such as a central processing unit, a microprocessor, a microprocessor unit, a digital signal processor, an application-specific integrated circuit (ASIC), or an equivalent circuit thereof. The auxiliary processor 112_*b* can be a special-purpose processor capable of executing programs, such as an intelligence processing unit (IPU), a neural-network processing unit (NPU), or a graphics processing unit (GPU). The processor 112_*a* cooperates with the auxiliary processor 112_*b* to perform speech enhancement processing. That is to say, the chip 110 can use the execution capability of the auxiliary processor 112_*b* to accelerate the overall speech enhancement processing (i.e., to improve the overall performance of the chip 110).

In an alternative embodiment, the chip 110 may include only the processor 112_*a*, but not the auxiliary processor 112_*b*. In this case, the processor 112_*a* is responsible for all speech enhancement processing.

The audio processing circuit 114 performs audio processing on the target signal SE to generate a digital signal D2. The digital signal D2 can be outputted through the audio transmission circuit 111, or converted into an analog output signal ASout by the DAC 116 and then outputted to the output device 140. The output device 140 may be a speaker.

Figure 2:
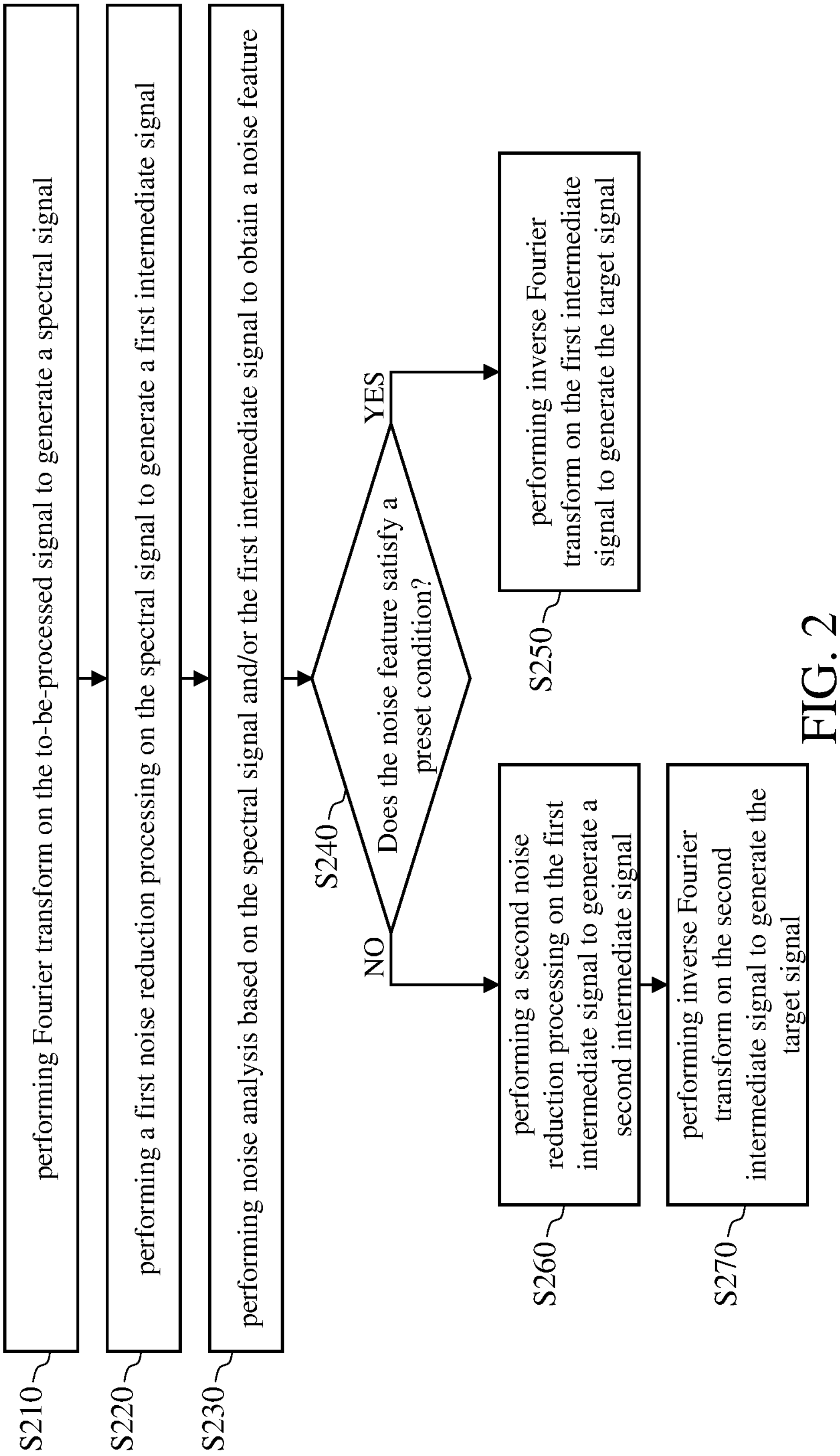
FIG. 2 is a flowchart of the speech enhancement method according to an embodiment of the present invention.

Reference is made to FIG. 2, which is a flowchart of a speech enhancement method according to an embodiment of the present invention. FIG. 2 is executed by the processing circuit 112 and includes the following steps.

Step S210: performing Fourier transform (such as short-time Fourier transform (STFT)) on the to-be-processed signal SN to generate a spectral signal MG of the to-be-processed signal SN.

Step S220: performing a first noise reduction processing on the spectral signal MG to generate a first intermediate signal MM.

Step S230: performing noise analysis based on the spectral signal MG and/or the first intermediate signal MM to obtain a noise feature.

Step S240: determining whether the noise feature satisfies a preset condition. If YES, the flow proceeds to step S250; if NO, the flow proceeds to step S260 and step S270.

Step S250: performing inverse Fourier transform (such as inverse short-time Fourier transform (ISTFT)) on the first intermediate signal MM to generate the target signal SE.

Step S260: performing a second noise reduction processing on the first intermediate signal MM to generate a second intermediate signal SR.

Step S270: performing inverse Fourier transform on the second intermediate signal SR to generate the target signal SE.

The implementation details of FIG. 2 will be discussed below with reference to FIGS. 3 to 9.

Figure 3:
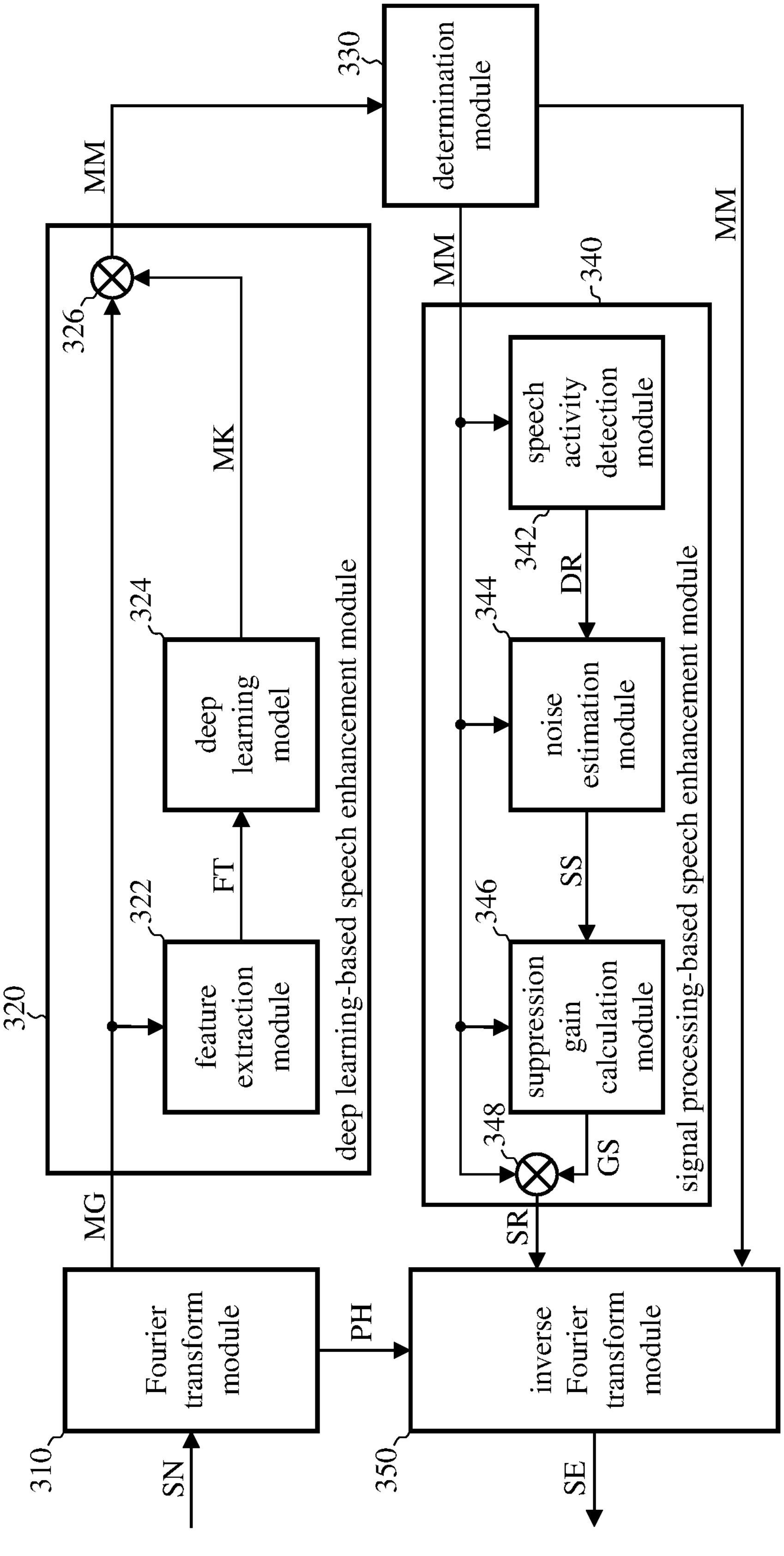
FIG. 3 is a block diagram of the functional modules of the processing circuit according to an embodiment of the present invention.

Reference is made to FIG. 3, which is a block diagram of the functional modules of the processing circuit according to an embodiment of the present invention. The processing circuit 112 includes the following functional modules: a Fourier transform module 310, a deep learning-based speech enhancement module 320, a determination module 330, a signal processing-based speech enhancement module 340, and an inverse Fourier transform module 350.

The Fourier transform module 310 corresponds to step S210 in FIG. 2. The inverse Fourier transform module 350 corresponds to step S250 and step S270 in FIG. 2. In addition to the spectral signal MG, the Fourier transform module 310 also generates a phase signal PH. The inverse Fourier transform module 350 performs inverse Fourier transform on the first intermediate signal MM or the second intermediate signal SR according to the phase signal PH to generate the target signal SE. The implementation details of the Fourier transform module 310 and the inverse Fourier transform module 350 are well known to people having ordinary skill in the art, so the details are thus omitted for brevity.

The deep learning-based speech enhancement module 320 corresponds to step S220 in FIG. 2. More specifically, the deep learning-based speech enhancement module 320 performs noise suppression on the spectral signal MG based on deep learning. That is to say, the first noise reduction processing in step S220 is a deep learning-based noise reduction processing. The first intermediate signal MM is the resulting signal after the to-be-processed signal SN has been noise-reduced once. The deep learning-based speech enhancement module 320 includes a feature extraction module 322, a deep learning model 324, and a multiplication circuit 326. In some embodiments, operations related to the deep learning-based speech enhancement module 320 may be performed by the auxiliary processor 112_*b*.

The feature extraction module 322 is used to extract the speech feature FT of the spectral signal MG. The speech feature FT may be the amplitude spectrum of the spectral signal MG. In some embodiments, the deep learning model 324 includes a one-dimensional convolutional layer, a recurrent neural network layer, a linear layer, and an activation layer. The deep learning model 324 calculates a mask MK according to the speech feature FT. The multiplication circuit 326 suppresses a specific frequency spectrum by multiplying the spectral signal MG with the mask MK. In some embodiments, the mask MK includes multiple "1"s and "0"s; the spectrum corresponding to "1" is preserved while the spectrum corresponding to "0" is suppressed.

With respect to training the deep learning model 324, people having ordinary skill in the art know how to provide various input signals and corresponding output signals to the deep learning-based speech enhancement module 320, so the training details are omitted for brevity.

The determination module 330 corresponds to step S230 and step S240 in FIG. 2. The details of step S230 and step S240 will be discussed below with reference to FIG. 4 to FIG. 6.

The signal processing-based speech enhancement module 340 corresponds to step S260 in FIG. 2. More specifically, the signal processing-based speech enhancement module 340 performs noise suppression on the first intermediate signal MM based on signal processing. That is to say, the second noise reduction processing in step S260 is a signal processing-based noise reduction processing. Compared with the deep learning of the first noise reduction processing, the second noise reduction processing does not use a deep learning model, but is based on signal processing that detects the speech components in the audio signal and estimates the noise, and then performs noise reduction processing on the speech signal according to the speech components and the noise. The second intermediate signal SR is the resulting signal after the to-be-processed signal SN has been noise-reduced twice. The signal processing-based speech enhancement module 340 includes a speech activity detection module 342, a noise estimation module 344, a suppression gain calculation module 346, and a multiplication circuit 348.

The speech activity detection module 342 is used to perform speech activity detection on the first intermediate signal MM to generate a detection result DR. In some specific embodiments, the detection result DR includes the probability of presence of the speech corresponding to each frequency point. The noise estimation module 344 estimates the amplitude spectrum SS of the residual noise of the first intermediate signal MM according to the detection result DR. The suppression gain calculation module 346 calculates the suppression gain GS according to the first intermediate signal MM and the amplitude spectrum SS. The multiplication circuit 348 multiplies the first intermediate signal MM by the suppression gain GS to generate the second intermediate signal SR.

In some embodiments, the noise estimation module 344 estimates the amplitude spectrum SS of the residual noise of the first intermediate signal MM based on the following equations. In the following equations, Y represents the first intermediate signal MM, $\tilde{\lambda}_d$ represents the amplitude spectrum SS of the residual noise, $S_f$ is the amplitude spectrum after frequency domain smoothing, b(i) is the frequency domain smoothing factor, w is the frequency domain smoothing window length, S is the amplitude spectrum after time domain smoothing, $\alpha_s$ is the time domain smoothing factor, k is the frequency point, and I is the speech frame.

Firstly, the corresponding smooth amplitude spectrum S is calculated for the first intermediate signal MM (i.e., the spectrum Y after deep-learning speech enhancement) based on equations (1)-(2).

$$S_f(k,\ell)=\sum_{i=-w}^{w} b(i)|Y(k-i,\ell)|^2 \tag{1}$$

$$S(k,\ell)=\alpha_s(k,\ell)S(k,\ell-1)+S_f(k,\ell) \tag{2}$$

Next, local minimum tracking is calculated based on equations (3) to (5), where $S_{min}$ is the global minimum and $S_{tmp}$ is the local minimum. Equation (3) is for initialization, equation (4) is for tracking the local minimum and global minimum, and equation (5) is for updating the tracking results.

$$\begin{cases} S_{min}(k,\ell)=S(k,0) \\ S_{tmp}(k,\ell)=S(k,0) \end{cases} \tag{3}$$

$$\begin{cases} S_{min}(k,\ell)=\min\{S_{min}(k,\ell-1),S(k,\ell)\} \\ S_{tmp}(k,\ell)=\min\{S_{tmp}(k,\ell-1),S(k,\ell)\} \end{cases} \tag{4}$$

$$\begin{cases} S_{min}(k,\ell)=\min\{S_{tmp}(k,\ell-1),S(k,\ell)\} \\ S_{tmp}(k,\ell)=S(k,\ell) \end{cases} \tag{5}$$

Then, the signal-to-noise ratio (SNR) and speech presence judgment are calculated based on equations (6)-(7), where I is the speech presence judgment result, and "1" and "0" indicate speech presence and absence, respectively.

$$S_r(k,\ell)\triangleq\frac{S(k,\ell)}{S_{min}(k,\ell)} \tag{6}$$

$$I(k,\ell)=\begin{cases} 1, & S_r(k,\ell)>\delta \\ 0, & \text{otherwise} \end{cases} \tag{7}$$

Then, the speech presence probability is updated based on equation (8).

$$\hat{p}'(k,\ell)=\alpha_p\hat{p}'(k,\ell-1)+(1-\alpha_p)I(k,\ell) \tag{8}$$

Then, the smoothing factor is calculated based on equation (9).

$$\tilde{\alpha}_d(k,\ell)\triangleq\alpha_d+(1-\alpha_d)p'(k,\ell) \tag{9}$$

Finally, the amplitude spectrum of the noise is updated based on equation (10).

$$\hat{\lambda}_d(k, \ell+1) = \tilde{\alpha}_d(k, \ell)\hat{\lambda}_d(k, \ell) + [1 - \tilde{\alpha}_d(k, \ell)]|Y(k, \ell)|^2 \tag{10}$$

In some embodiments, the suppression gain calculation module 346 calculates the suppression gain $\hat{A}_k$ based on equation (11).

$$\hat{A}_k = \Gamma(1.5)\frac{\sqrt{v_k}}{\gamma_k}\exp\left(-\frac{v_k}{2}\right)\left[(1+v_k)I_0\left(\frac{v_k}{2}\right) + v_k I_1\left(\frac{v_k}{2}\right)\right]R_k \tag{11}$$

Figure 4:
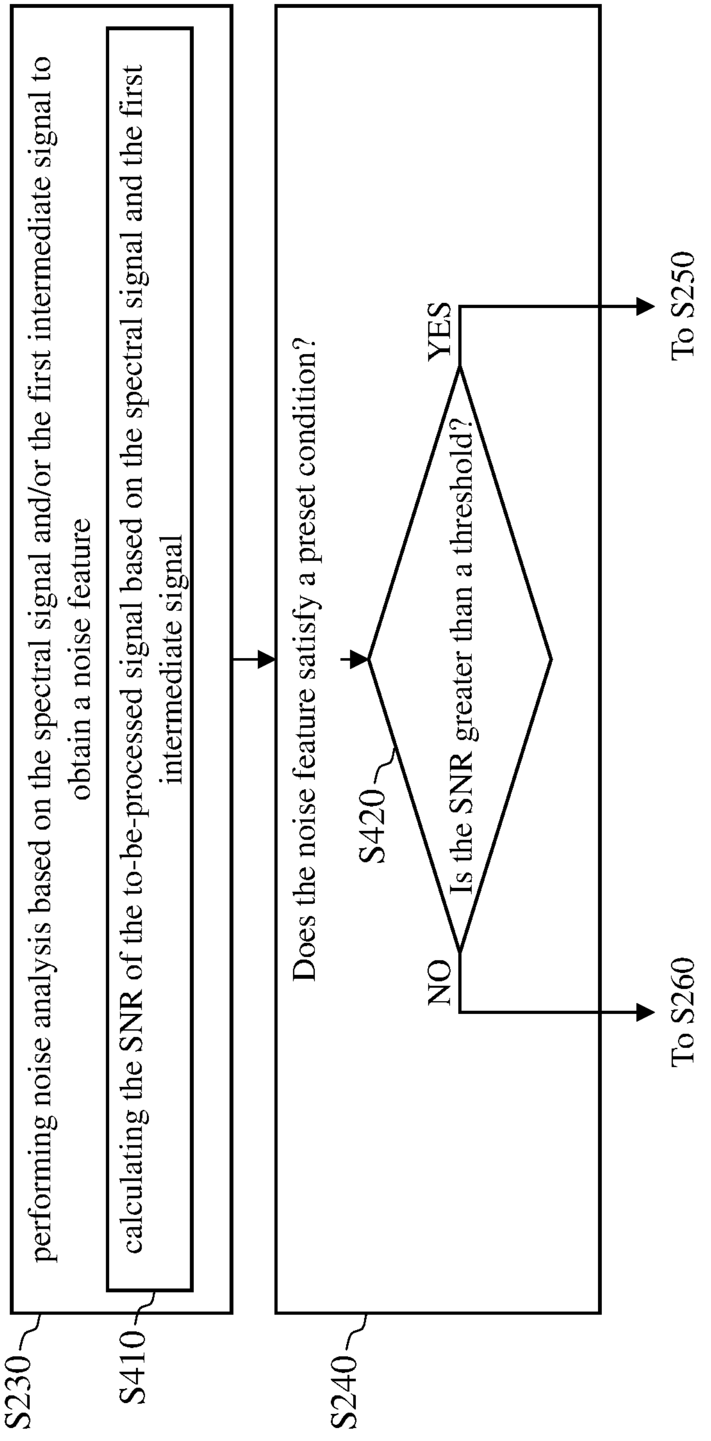
FIG. 4 shows the details of the determination module 330 in FIG. 3 according to a first embodiment.

Reference is made to FIG. 4, which shows the details of the determination module 330 in FIG. 3 (i.e., corresponding to step S230 and step S240 in FIG. 2) according to a first embodiment.

Step S230 includes sub-step S410: calculating the SNR of the to-be-processed signal SN based on the spectral signal MG and the first intermediate signal MM. The SNR is the aforementioned noise feature. More specifically, the processing circuit 112 calculates the SNR according to equation (12).

$$SNR = 10\log_{10}\frac{\|MM\|^2}{\|MM - MG\|^2} \tag{12}$$

In some embodiments, the SNR may also be replaced by a scale invariant source-to-artifact ratio (SI-SAR) or a scale invariant signal-to-distortion ratio (SI-SDR).

Step S240 includes sub-step S420: determining whether the SNR is greater than a threshold. The threshold can be determined by the user based on experience and/or the current application environment. If YES (meaning that the quality of the first intermediate signal MM is good enough), the flow proceeds to step S250; if NO, the flow proceeds to step S260 to perform the second noise reduction processing.

Figure 5:
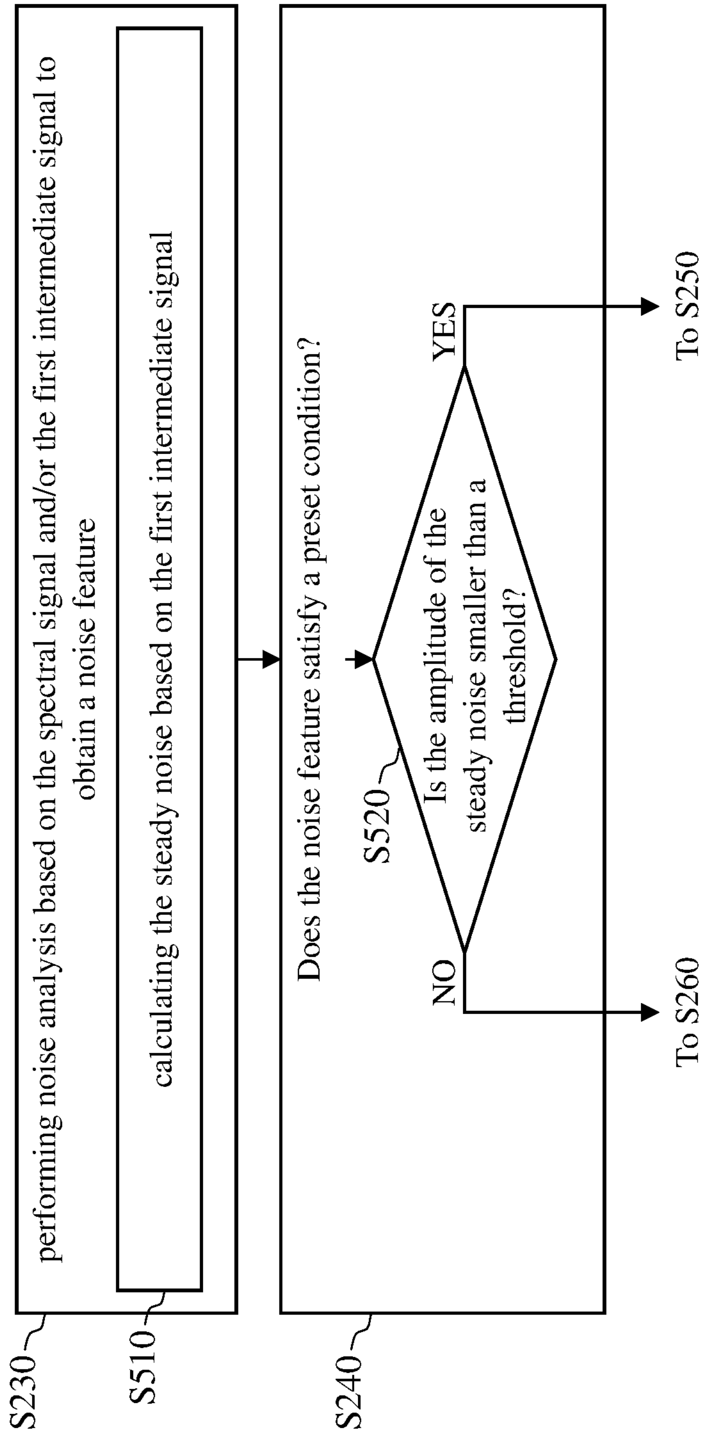
FIG. 5 shows the details of the determination module 330 in FIG. 3 according to a second embodiment.

Reference is made to FIG. 5, which shows the details of the determination module 330 in FIG. 3 (i.e., corresponding to step S230 and step S240 in FIG. 2) according to a second embodiment.

Step S230 includes sub-step S510: calculating the steady noise based on the first intermediate signal MM. The steady noise is the aforementioned noise feature. The steady noise refers to steady sounds in the background (e.g., constant noise such as the sound of wind, air conditioners running, etc.). The steady noise of the first intermediate signal MM can be calculated by performing spectrum analysis on the first intermediate signal MM. Spectrum analysis techniques are well known to people having ordinary skill in the art, so the details are thus omitted for brevity.

Step S240 includes sub-step S520: determining whether the amplitude of the steady noise is smaller than a threshold. If YES (meaning that the steady noise of the first intermediate signal MM is small enough), the flow proceeds to step S250; if NO, the flow proceeds to step S260 to perform the second noise reduction processing.

Figure 6:
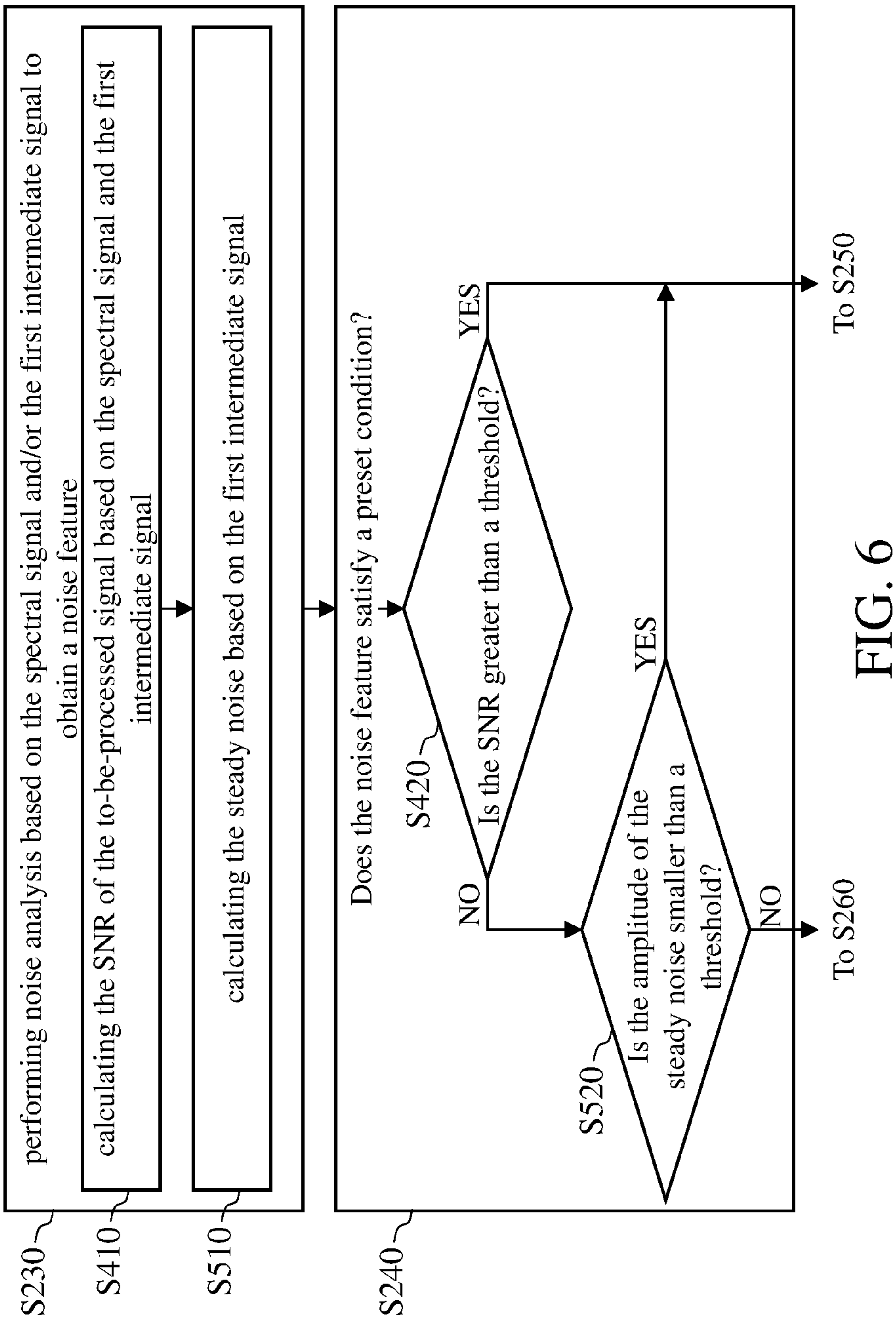
FIG. 6 shows the details of the determination module 330 in FIG. 3 according to a third embodiment.

Reference is made to FIG. 6, which shows the details of the determination module 330 in FIG. 3 (i.e., corresponding to step S230 and step S240 in FIG. 2) according to a third embodiment. The embodiment of FIG. 6 is a combination of the embodiment of FIG. 4 and the embodiment of FIG. 5. Step S230 includes sub-steps S410 and S510. In other words, in the embodiment of FIG. 6, the noise feature includes the SNR and the steady noise. Step S240 includes sub-steps S420 and S520. More specifically, when the SNR is not greater than the first threshold (step S420 is NO), the processing circuit 112 further determines whether the amplitude of the steady noise of the first intermediate signal MM is smaller than the second threshold. When step S420 and step S520 are both NO, the flow proceeds to step S260; otherwise, the flow proceeds to step S250. The first threshold may or may not be equal to the second threshold.

The difference between the embodiment of FIG. 6 and the embodiment of FIG. 4 is that, in the embodiment of FIG. 6, the noise feature further includes the steady noise, and step S240 further includes step S520. That is to say, even if the SNR of the first intermediate signal MM is not greater than the first threshold (i.e., step S420 is NO, meaning that the quality of the first intermediate signal MM has not yet reached the user-defined criterion), the processing circuit 112 performs the signal processing-based noise reduction processing on the first intermediate signal MM only when the amplitude of the steady noise is not less than the second threshold (i.e., step S520 is NO). Thus, the power consumption of the chip 110 can be saved.

Figure 7:
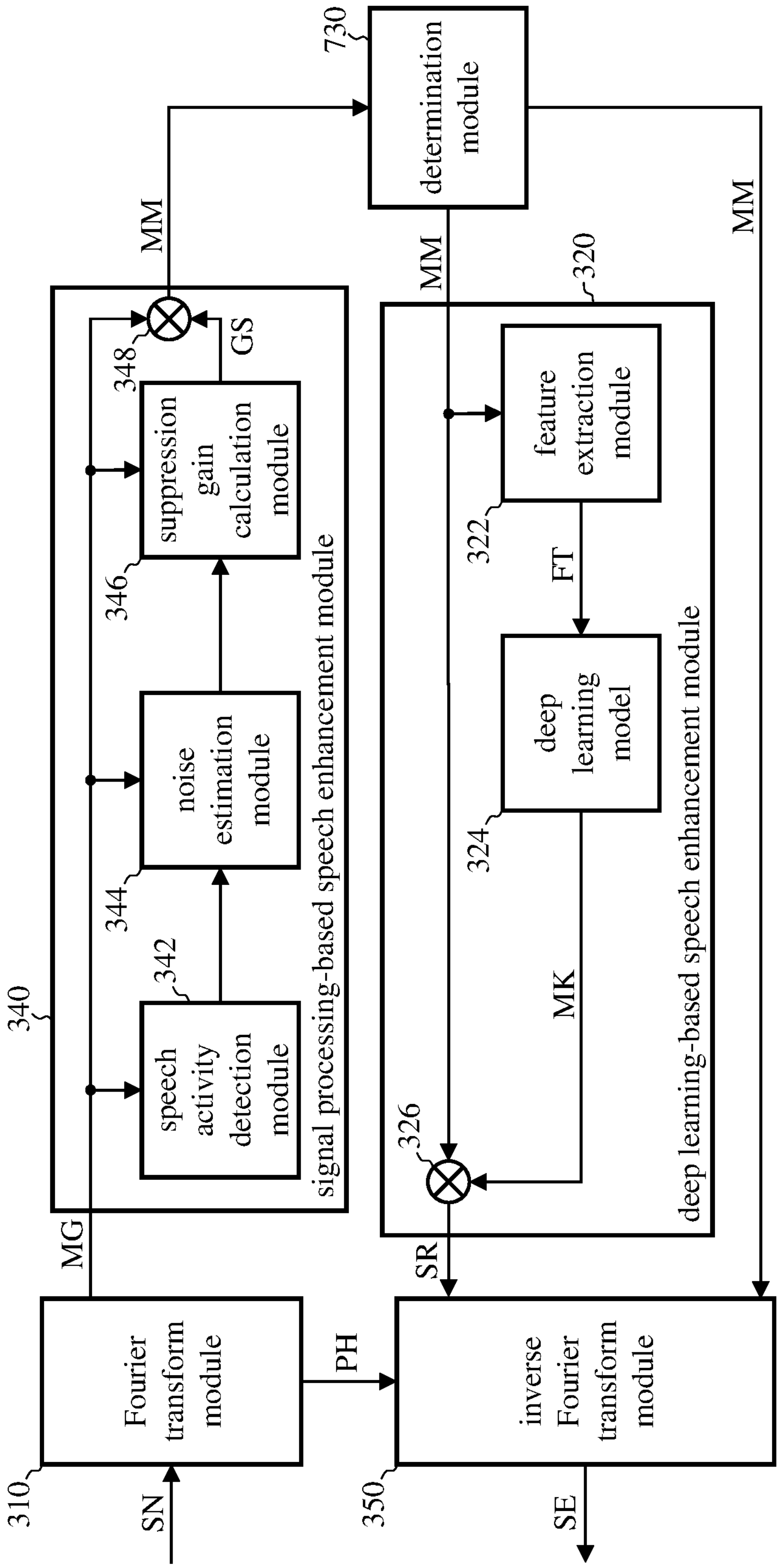
FIG. 7 is a block diagram of the functional modules of the processing circuit according to another embodiment of the present invention.

Reference is made to FIG. 7, which is a block diagram of the functional modules of the processing circuit according to another embodiment of the present invention. FIG. 7 is similar to FIG. 3, except that in the embodiment of FIG. 7, the first noise reduction processing corresponding to step S220 is a signal processing-based noise reduction processing, and the second noise reduction processing corresponding to step S260 is a deep learning-based noise reduction processing. More specifically, the signal processing-based speech enhancement module 340 corresponds to step S220 in FIG. 2, and the deep learning-based speech enhancement module 320 corresponds to step S260 in FIG. 2. Reference can be made to the discussion of FIG. 3 for the operational details of the Fourier transform module 310, the deep learning-based speech enhancement module 320, the signal processing-based speech enhancement module 340, and the inverse Fourier transform module 350. The details of the determination module 730 are discussed below with reference to FIG. 4, FIG. 8, and FIG. 9.

In the first embodiment of the determination module 730, the processing circuit 112 performs determination according to the SNR of the to-be-processed signal SN. Reference can be made to the embodiment of FIG. 4 for details.

Figure 8:
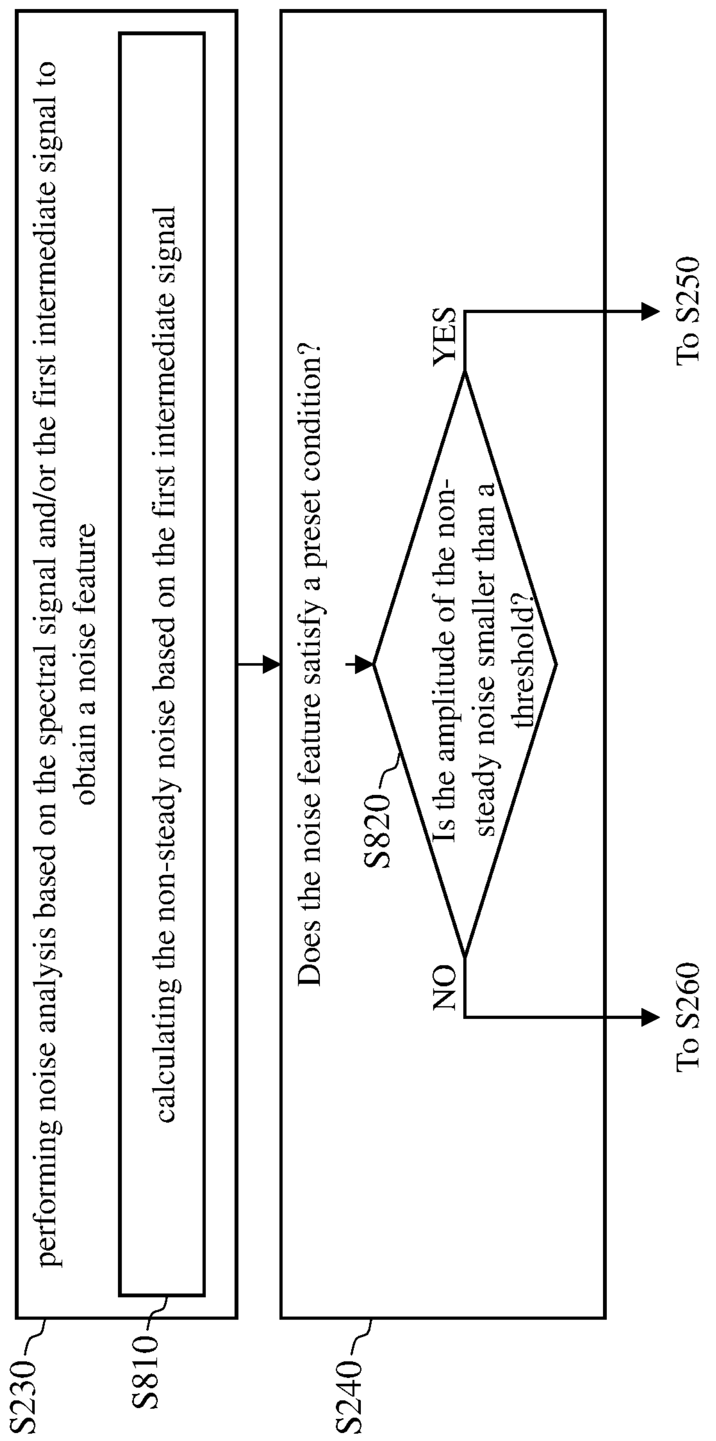
FIG. 8 shows the details of the determination module 730 in FIG. 7 according to a second embodiment.

Reference is made to FIG. 8, which shows the details of the determination module 730 in FIG. 7 (i.e., corresponding to step S230 and step S240 in FIG. 2) according to a second embodiment.

Step S230 includes sub-step S810: calculating the non-steady noise based on the first intermediate signal MM. The non-steady noise is the aforementioned noise feature. The non-steady noise refers to sudden sounds in the background (e.g., instantaneous sounds, such as the sound of door closing, object falling to the ground, etc.). The non-steady noise of the first intermediate signal MM can be calculated by performing spectrum analysis on the first intermediate signal MM.

Step S240 includes sub-step S820: determining whether the amplitude of the non-steady noise is smaller than a threshold. If YES (meaning that the non-steady noise of the first intermediate signal MM is small enough), the flow proceeds to step S250; if NO, the flow proceeds to step S260 to perform the second noise reduction processing.

Figure 9:
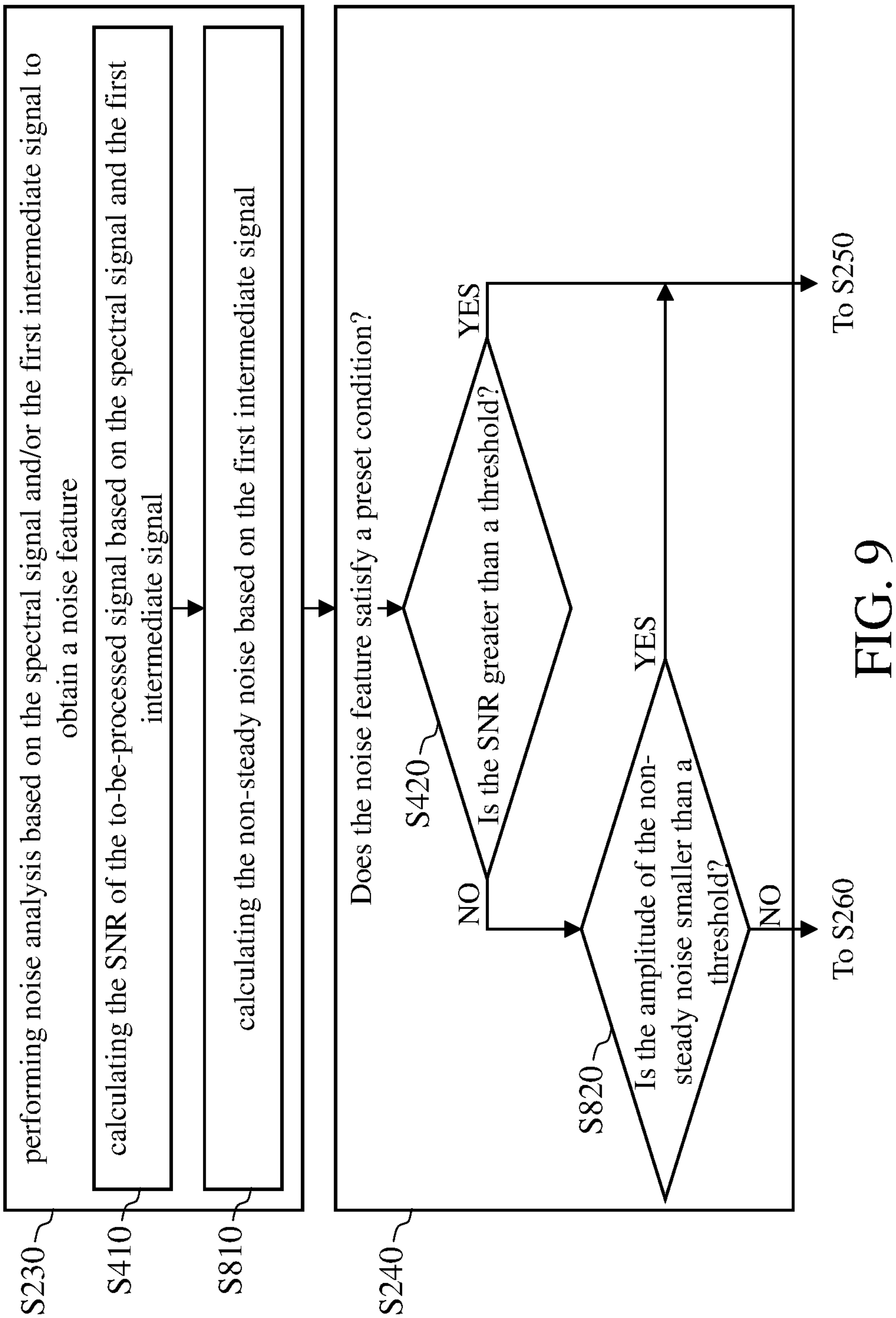
FIG. 9 shows the details of the determination module 730 in FIG. 7 according to a third embodiment.

Reference is made to FIG. 9, which shows the details of the determination module 730 in FIG. 7 (i.e., corresponding to step S230 and step S240 in FIG. 2) according to a third embodiment. The embodiment of FIG. 9 is a combination of the embodiment of FIG. 4 and the embodiment of FIG. 8.

Step S230 includes sub-steps S410 and S810. In other words, in the embodiment of FIG. 9, the noise feature includes the SNR and the non-steady noise. Step S240 includes sub-steps S420 and S820. More specifically, when the SNR is not greater than the first threshold (step S420 is NO), the processing circuit 112 further determines whether the amplitude of the non-steady noise of the first intermediate signal MM is less than the second threshold. When step S420 and step S820 are both NO, the flow proceeds to step S260; otherwise, the flow proceeds to step S250.

The difference between the embodiment of FIG. 9 and the embodiment of FIG. 4 is that, in the embodiment of FIG. 9, the noise feature further includes the non-steady noise, and step S240 further includes step S820. That is to say, even if the SNR of the first intermediate signal MM is not greater than the first threshold (i.e., step S420 is NO, meaning that the quality of the first intermediate signal MM has not yet reached the user-defined criterion), the processing circuit 112 performs the deep learning-based noise reduction processing on the first intermediate signal MM only when the amplitude of the non-steady noise is not less than the second threshold (i.e., step S820 is NO). Thus, the power consumption of the chip 110 can be saved.

In the embodiment of FIG. 3, the signal processing-based speech enhancement module 340 can make up for the deficiency of the deep learning-based speech enhancement module 320. For example, when the to-be-processed signal SN is a signal that was not included in the training data of the deep learning model 324, the deep learning-based speech enhancement module 320 cannot perform effective noise suppression on the to-be-processed signal SN; this is when the signal processing-based speech enhancement module 340 comes in to perform further noise suppression on the first intermediate signal MM. In other words, the embodiment of FIG. 3 can effectively reduce the amount of data, training time, and model size required by the deep learning model 324.

In the embodiment of FIG. 7, the deep learning-based speech enhancement module 320 can make up for the deficiency of the signal processing-based speech enhancement module 340. For example, when the to-be-processed signal SN contains the non-steady noise, the signal processing-based speech enhancement module 340 cannot perform effective noise suppression on the to-be-processed signal SN; this is when the deep learning-based speech enhancement module 320 comes in to perform further noise suppression on the first intermediate signal MM.

As far as the training of the deep learning model 324 is concerned, the embodiment of FIG. 3 is easier to implement than the embodiment of FIG. 7 because the to-be-processed signal SN (the signal processed by the deep learning-based speech enhancement module 320 of FIG. 3) is easier to obtain than the first intermediate signal MM (the signal processed by the deep learning-based speech enhancement module 320 of FIG. 7). In other words, the embodiment of FIG. 3 directly uses the original signal (the to-be-processed signal SN) to train the deep learning model 324, while the embodiment of FIG. 7 must perform signal processing-based noise reduction processing on the original signal before training the deep learning model 324.

The embodiment of FIG. 4 is easier to implement than the embodiments of FIG. 5 and FIG. 8 because calculating the SNR (equation (12)) is faster and requires less power than performing spectrum analysis (because the calculation is simpler).

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A processing circuit for processing a to-be-processed signal to generate a target signal, the processing circuit executing a plurality of program codes or program instructions to perform following steps:

performing Fourier transform on the to-be-processed signal to generate a spectral signal of the to-be-processed signal;

performing a first noise reduction processing on the spectral signal to obtain a first intermediate signal;

performing a noise analysis on the first intermediate signal to obtain a noise feature;

performing a second noise reduction processing on the first intermediate signal to generate a second intermediate signal when the noise feature does not satisfy a target condition;

performing inverse Fourier transform on the second intermediate signal to generate the target signal; and performing inverse Fourier transform on the first intermediate signal to generate the target signal when the noise feature does satisfy the target condition;

wherein the first noise reduction processing is different from the second noise reduction processing; the processing circuit comprises a general-purpose processor and a special-purpose processor, one of the first noise reduction processing and the second noise reduction processing is a deep learning-based noise reduction processing performed by the special-purpose processor.

2. The processing circuit of claim 1, wherein the first noise reduction processing is the deep learning-based noise reduction processing performed by the special-purpose processor, the second noise reduction processing is a signal processing-based noise reduction processing performed by the general-purpose processor, the noise analysis comprises calculating a signal-to-noise ratio (SNR) of the to-be-processed signal based on the spectral signal and the first intermediate signal, the noise feature comprises the SNR, and the target condition is that the SNR is greater than a threshold.

3. The processing circuit of claim 1, wherein the first noise reduction processing is the deep learning-based noise reduction processing performed by the special-purpose processor, the second noise reduction processing is a signal processing-based noise reduction processing performed by the general-purpose processor, the noise analysis comprises calculating a steady noise based on the first intermediate signal, the noise feature comprises the steady noise, and the target condition is that an amplitude of the steady noise is less than a threshold.

4. The processing circuit of claim 1, wherein the first noise reduction processing is the deep learning-based noise reduction processing performed by the special-purpose processor, the second noise reduction processing is a signal processing-based noise reduction processing performed by the general-purpose processor, and the deep learning-based noise reduction processing comprises extracting a speech feature of the spectral signal, calculating a mask according to the speech feature, and multiplying the spectral signal and the mask to generate the first intermediate signal; the signal processing-based noise reduction processing comprises performing a speech activity detection on the first intermediate signal to generate a detection result, estimating an amplitude spectrum of a residual noise of the first intermediate signal according to the detection result, calculating a suppression gain according to the first intermediate signal and the amplitude spectrum, and multiplying the first intermediate signal by the suppression gain to generate the second intermediate signal.

5. The processing circuit of claim 1, wherein the first noise reduction processing is a signal processing-based noise reduction processing performed by the general-purpose processor, the second noise reduction processing is the deep learning-based noise reduction processing performed by the special-purpose processor, the noise analysis comprises calculating a non-steady noise based on the first intermediate signal, the noise feature comprises the non-steady noise, and the target condition is that an amplitude of the non-steady noise is less than a threshold.

6. The processing circuit of claim 1, wherein the first noise reduction processing is a signal processing-based noise reduction processing performed by the general-purpose processor, the second noise reduction processing is the deep learning-based noise reduction processing performed by the special-purpose processor, the noise analysis comprises calculating a signal-to-noise ratio (SNR) of the to-be-processed signal based on the spectral signal and the first intermediate signal and calculating a non-steady noise based on the first intermediate signal, the noise feature comprises the SNR and the non-steady noise, and the target condition is that the SNR is greater than a first threshold or an amplitude of the non-steady noise is smaller than a second threshold.

7. A speech enhancement method, performed by a processing circuit, for processing a to-be-processed signal to generate a target signal, comprising:

performing Fourier transform on the to-be-processed signal to generate a spectral signal of the to-be-processed signal;

performing a first noise reduction processing on the spectral signal to obtain a first intermediate signal;

performing a noise analysis on the first intermediate signal to obtain a noise feature;

performing a second noise reduction processing on the first intermediate signal to generate a second intermediate signal when the noise feature does not satisfy a target condition;

performing inverse Fourier transform on the second intermediate signal to generate the target signal; and performing inverse Fourier transform on the first intermediate signal to generate the target signal when the noise feature does satisfy the target condition;

wherein the first noise reduction processing is different from the second noise reduction processing; the processing circuit comprises a general-purpose processor and a special-purpose processor, one of the first noise reduction processing and the second noise reduction processing is a deep learning-based noise reduction processing performed by the special-purpose processor.

8. The speech enhancement method of claim 7, wherein the first noise reduction processing is the deep learning-based noise reduction processing performed by the special-purpose processor, the second noise reduction processing is a signal processing-based noise reduction processing performed by the general-purpose processor, the noise analysis comprises calculating a signal-to-noise ratio (SNR) of the to-be-processed signal based on the spectral signal and the first intermediate signal, the noise feature comprises the SNR, and the target condition is that the SNR is greater than a threshold.

9. The speech enhancement method of claim 7, wherein the first noise reduction processing is the deep learning-based noise reduction processing performed by the special-purpose processor, the second noise reduction processing is a signal processing-based noise reduction processing performed by the general-purpose processor, the noise analysis comprises calculating a steady noise based on the first intermediate signal, the noise feature comprises the steady noise, and the target condition is that an amplitude of the steady noise is less than a threshold.

10. The speech enhancement method of claim 7, wherein the first noise reduction processing is the deep learning-based noise reduction processing performed by the special-purpose processor, the second noise reduction processing is a signal processing-based noise reduction processing performed by the general-purpose processor, and the deep learning-based noise reduction processing comprises extracting a speech feature of the spectral signal, calculating a mask according to the speech feature, and multiplying the spectral signal and the mask to generate the first intermediate signal; the signal processing-based noise reduction processing comprises performing a speech activity detection on the first intermediate signal to generate a detection result, estimating an amplitude spectrum of a residual noise of the first intermediate signal according to the detection result, calculating a suppression gain according to the first intermediate signal and the amplitude spectrum, and multiplying the first intermediate signal by the suppression gain to generate the second intermediate signal.

11. A speech enhancement method, performed by a processing circuit, for processing a to-be-processed signal to generate a target signal, comprising:

performing Fourier transform on the to-be-processed signal to generate a spectral signal of the to-be-processed signal;

performing a first noise reduction processing on the spectral signal to obtain a first intermediate signal;

performing a second noise reduction processing on the first intermediate signal to generate a second intermediate signal when a noise feature of the first intermediate signal does not satisfy a target condition;

performing inverse Fourier transform on the second intermediate signal to generate the target signal; and performing inverse Fourier transform on the first intermediate signal to generate the target signal when the noise feature of the first intermediate signal does satisfy the target condition;

wherein the first noise reduction processing is different from the second noise reduction processing; the processing circuit comprises a general-purpose processor and a special-purpose processor, one of the first noise reduction processing and the second noise reduction processing is a deep learning-based noise reduction processing performed by the special-purpose processor.

12. The speech enhancement method of claim 11, wherein the speech enhancement method further comprises:

performing, by the special-purpose processor, the noise analysis on the first intermediate signal to obtain the noise feature; and determining, by the general-purpose processor, whether to perform the second noise reduction processing on the first intermediate signal according to the noise feature and the target condition.

13. The speech enhancement method of claim 11, wherein the first noise reduction processing is the deep learning-based noise reduction processing performed by the special-purpose processor, the second noise reduction processing is a signal processing-based noise reduction processing performed by the general-purpose processor; the deep learning-based noise reduction processing comprises extracting a speech feature of the spectral signal, calculating a mask according to the speech feature, and multiplying the spectral signal and the mask to generate the first intermediate signal; the signal processing-based noise reduction processing comprises performing a speech activity detection on the first intermediate signal to generate a detection result, estimating an amplitude spectrum of a residual noise of the first intermediate signal according to the detection result, calculating a suppression gain according to the first intermediate signal and the amplitude spectrum, and multiplying the first intermediate signal by the suppression gain to generate the second intermediate signal.

* * * * *